United States Patent
Beach et al.

(10) Patent No.: US 11,754,702 B2
(45) Date of Patent: Sep. 12, 2023

(54) METHOD AND SYSTEM FOR HIGH-INTEGRITY VEHICLE LOCALIZATION AND SPEED DETERMINATION

(71) Applicant: THALES CANADA INC, Toronto (CA)

(72) Inventors: David Beach, Toronto (CA); Philip Christian, Toronto (CA); Alon Green, Toronto (CA)

(73) Assignee: THALES CANADA INC., Ontario (CA)

( * ) Notice: Subject to any disclaimer, the term of this patent is extended or adjusted under 35 U.S.C. 154(b) by 396 days.

(21) Appl. No.: 17/025,467

(22) Filed: Sep. 18, 2020

(65) Prior Publication Data

US 2021/0080566 A1 Mar. 18, 2021

Related U.S. Application Data

(60) Provisional application No. 62/901,989, filed on Sep. 18, 2019.

(51) Int. Cl.
*G01S 13/88* (2006.01)
*B61L 25/02* (2006.01)
*G01S 13/58* (2006.01)

(52) U.S. Cl.
CPC .......... *G01S 13/885* (2013.01); *B61L 25/021* (2013.01); *B61L 25/025* (2013.01); *G01S 13/58* (2013.01)

(58) Field of Classification Search
CPC ........ G01S 13/885; G01S 13/58; G01S 13/75; G01S 13/931; B61L 25/021; B61L 25/025
See application file for complete search history.

(56) References Cited

U.S. PATENT DOCUMENTS 2,636,113 A    4/1953  Deloraine
4,990,918 A *  2/1991  Michelson ............. H01Q 15/18
                                              342/7

(Continued)

FOREIGN PATENT DOCUMENTS

DE    102016223439 A1    5/2018
EP         3454079 A1    3/2019

(Continued)

OTHER PUBLICATIONS

International Search Report and Written Opinion issued in corresponding International Application No. PCT/IB2020/058739, dated Dec. 30, 2020, pp. 1-6, Canadian Intellectual Property Office, Quebec, Canada.

(Continued)

*Primary Examiner* — Geepy Pe
*Assistant Examiner* — Clint Pham
(74) *Attorney, Agent, or Firm* — HAUPTMAN HAM, LLP

(57) ABSTRACT

A vehicle locator includes an on-board computer and a ground penetrating radar mounted on the vehicle that is communicably connected to the on-board computer. A reflective landmark is located at a known location along the path of the vehicle. The reflective landmark includes reflective elements arranged to encode data. The ground penetrating radar transmits signal energy and detects reflected signal energy reflected by the reflective landmark and communicates encoded data representative of the reflected signal energy to the on-board computer. The on-board computer decodes the encoded data and thereby determines the location of the vehicle.

20 Claims, 10 Drawing Sheets

(56) References Cited

U.S. PATENT DOCUMENTS

| | | |
|---|---|---|
| 6,445,334 B1 | 9/2002 | Bradley et al. |
| 7,716,010 B2 | 5/2010 | Pelletier |
| 8,180,590 B2 | 5/2012 | Szwilski et al. |
| 8,854,249 B2 | 10/2014 | Paglieroni et al. |
| 8,924,143 B2 | 12/2014 | Makela |
| 8,949,024 B2 | 2/2015 | Stanley et al. |
| 8,954,292 B2 | 2/2015 | Troxler |
| 9,377,528 B2 | 6/2016 | Birken et al. |
| 9,562,778 B2 | 2/2017 | DuHadway et al. |
| 9,631,943 B2 | 4/2017 | Shashua et al. |
| 10,118,576 B2 | 11/2018 | Breed |
| 10,352,779 B2 | 7/2019 | Groeneweg et al. |
| 10,399,577 B2 | 9/2019 | Liu |
| 2005/0115753 A1 | 6/2005 | Pemberton et al. |
| 2010/0052971 A1 | 3/2010 | Amarillas |
| 2015/0378015 A1 | 12/2015 | You et al. |
| 2016/0161609 A1* | 6/2016 | Tanaka ............... G01S 13/582 342/81 |
| 2018/0217251 A1 | 8/2018 | Stanley et al. |
| 2018/0224540 A1 | 8/2018 | Stanley et al. |
| 2019/0064345 A1* | 2/2019 | Reed ................. G05D 1/0261 |
| 2019/0250269 A1* | 8/2019 | Miu ................... G01S 13/931 |

FOREIGN PATENT DOCUMENTS

| | | |
|---|---|---|
| WO | 2018158712 A1 | 9/2018 |
| WO | 2020121286 A1 | 6/2020 |

OTHER PUBLICATIONS

Ground Penetrating Radar Technology Evaluation and Implementation: Phase 2, Dept. of Transportation, Federal Railroad Administration, Office of Research, Development and Technology, Washington, DC, Sep. 2017.

Ground Penetrating Radar Technology Evaluation and Implementation, Research Results Report, Dept. of Transportation, Federal Railroad Administration, Office of Railroad Policy & Development, Washington, DC, RR 14-24, Jul. 2014.

WaveSense Launches the World's First Ground-Penetrating Radar Sensor for Self-Driving Vehicles, WaveSense, Aug. 20, 2018.

* cited by examiner

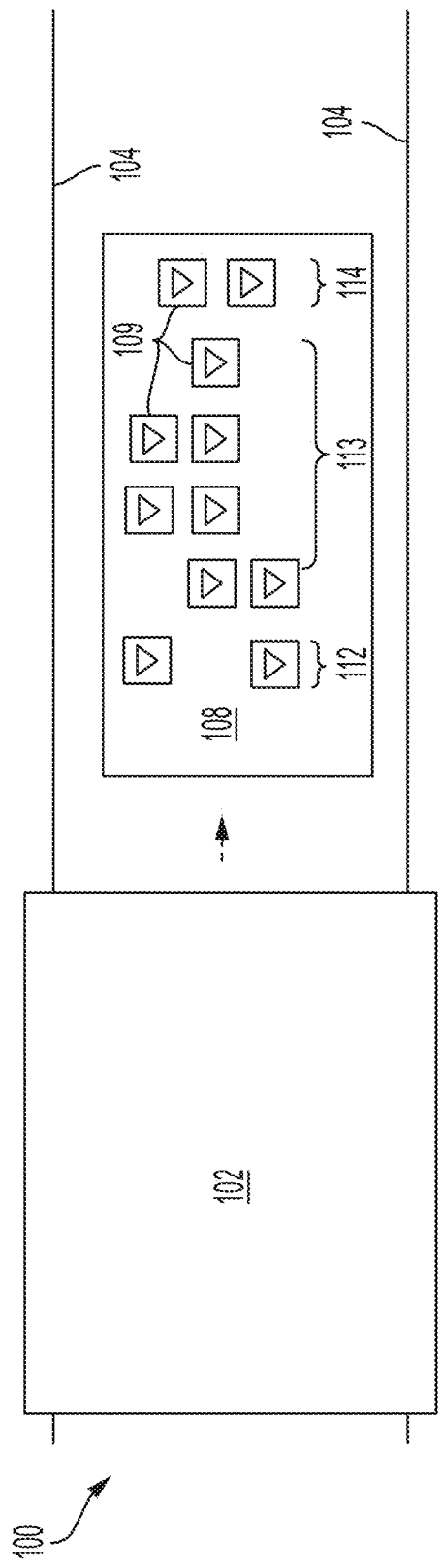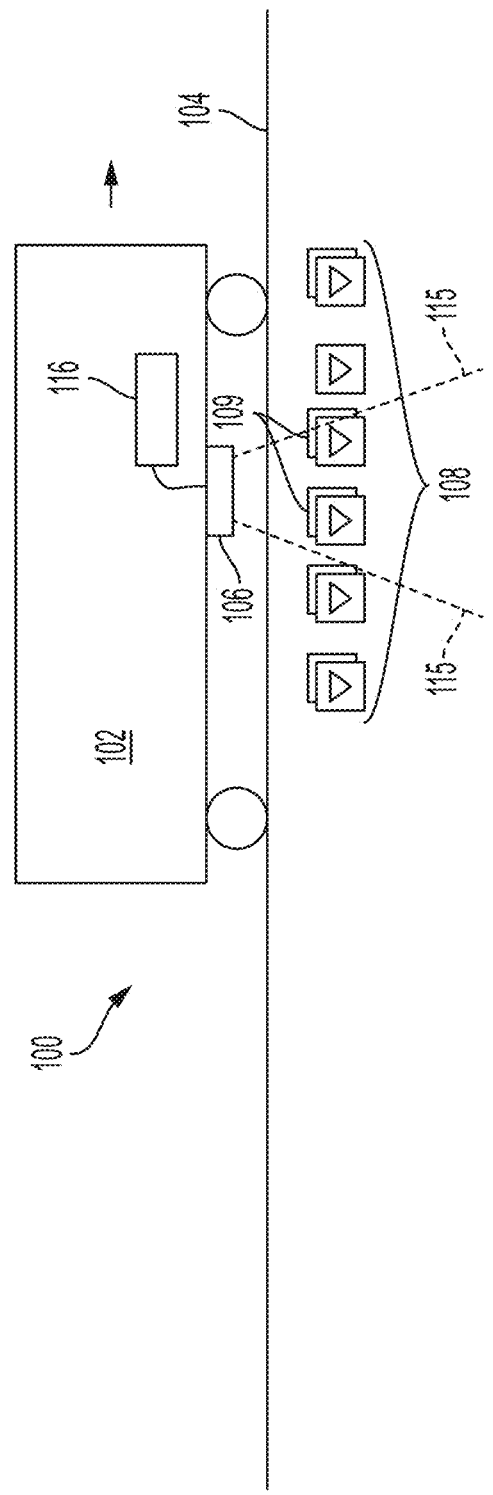

METHOD AND SYSTEM FOR HIGH-INTEGRITY VEHICLE LOCALIZATION AND SPEED DETERMINATION

PRIORITY

The present application claims the priority of U.S. Provisional Application No. 62/901,989, filed Sep. 18, 2019, which is incorporated herein by reference in its entirety.

BACKGROUND

Vehicles that travel over a wide variety of locations and environments face challenges; determining the current location of the vehicle, tracking the location of the vehicle as the vehicle moves, and accurately determining the speed of the vehicle. Some difficult locations are not suitable for conventional vehicle localization and speed determination systems or methods.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A and 1B depict an overhead and side view of a high-integrity vehicle localization and speed determination system, in accordance with some embodiments.

DETAILED DESCRIPTION

Figure 2:
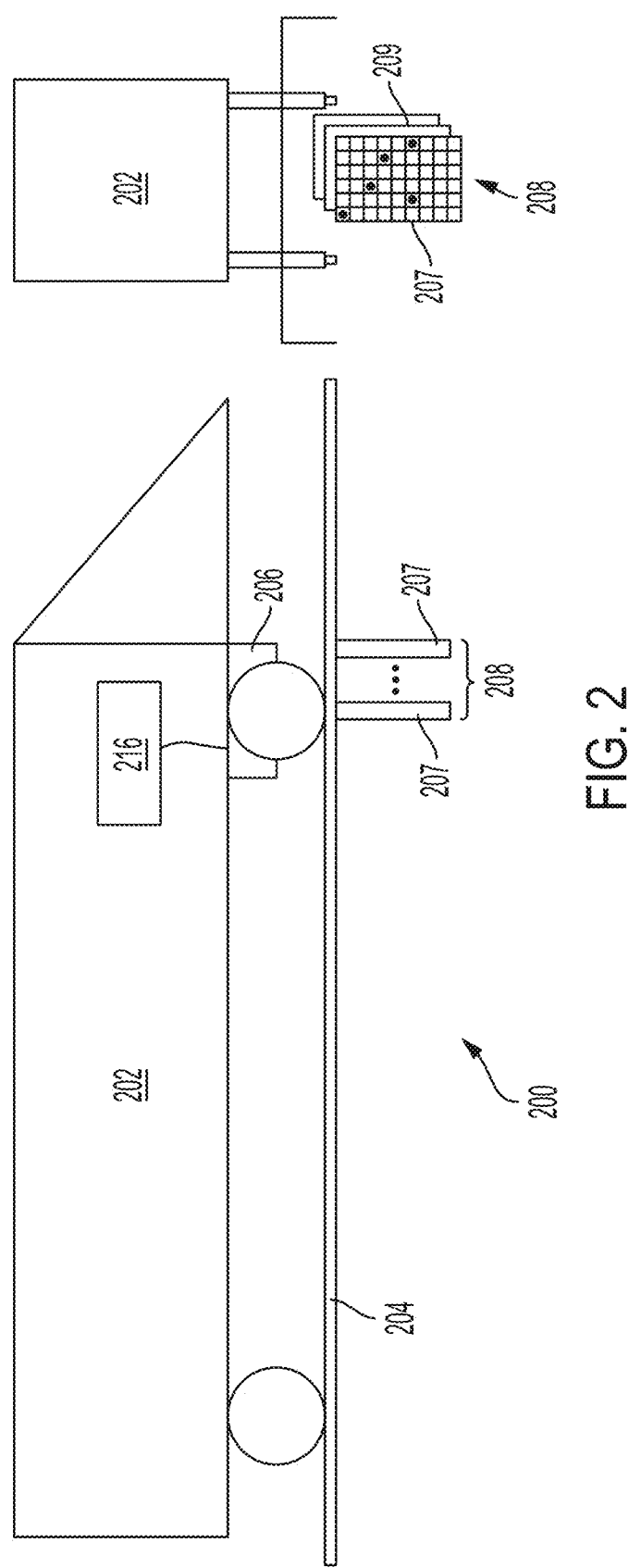
FIG. 2 depicts a landmark composed of many buried multiple-bit targets in sequence along the travel direction of the vehicle, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIGS. 1A and 1B depict an overhead and side view of a high-integrity vehicle localization and speed determination system 100, in accordance with an embodiment. A vehicle 102 moves along a track, rail, monorail, road, or other pre-defined path 104. The vehicle 102 is a train, subway, monorail, or any other path-constrained vehicle, including automobiles or buses.

Along the tracks 104, a landmark 108 is positioned beneath the ground so that a vehicle 102 passing along the tracks 104 passes over the landmark 108. A landmark 108 is formed by a physically distributed array of retroreflectors 109. The retroreflectors 109 are objects designed to reflect radar signals or similarly strongly reflecting objects. The retroreflectors 109 encode a single bit. In accordance with some embodiments, the retroreflectors 109 encode multiple-bits. The landmark 108 is an arranged group of detached retroreflectors 109. In accordance with another embodiment, a landmark 108 is a connected group of reflectors 109, attached together or connected to a frame, to maintain the relative positions of the reflectors 109 during installation and use.

The landmark 108 is a two-dimensional array of retroreflectors 109 that encodes a message to be communicated with the vehicle 102 as it passes over the landmark 108. The message is encoded using an array populated with the presence or absence of a retroreflector 109. As the vehicle 102 passes over the landmark 108, the retroreflectors 109 are read as a series of 3-bit columns where the presence of a retroreflector 109 represents a "1" and the absence of a retroreflector 109 represents a "0". For example, the first column 112 (extending in a direction transverse to both set of tracks 104) of retroreflectors 109 with two single-bit retroreflectors 109 separated by an empty space represent the bits "101" which represent the start bits in an exemplary communication scheme. In the same way, the next four columns 113 of retroreflectors 109 represent the data of the message being communicated by the landmark 108. As shown, the array of retroreflectors 109 in the sequence of four columns 113 represent the message "011 110 110 010". The two mis-aligned retroreflectors 109 in the last column 114 represent the stop bits, signifying the end of the encoded message. In other embodiments, the end of the encoded message is indicated by a different alignment or number of retroreflectors 109.

The buried retroreflectors 109 of the landmark 108 are detected by the vehicle 102 using a high-integrity vehicle localization and speed determination system 100 including a radar 106; the radar causes the generation of reflection data and sends reflection data to an on-board computer 116. The on-board computer 116 processes the reflection data to decode the encoded message. A radar 106 is mounted on the undercarriage of the vehicle 102. In accordance with some embodiments, multiple radars 106 are mounted on the vehicle 102. The radar 106 is a ground penetrating radar (GPR), a localized ground penetrating radar (LGPR) or any other suitable object detection system. The high-integrity vehicle localization and speed determination system 100 receives the message encoded by landmark 108 by detecting the relative location of each of the retroreflectors 109.

Custom-designed subsurface landmarks 108 are installed at known locations along a track 104. The landmarks 108 are installed by being buried in the ground at the predetermined locations. In accordance with some embodiments, the landmarks 108 are installed in walls or ceilings, provided that the operating environment allows such installation. In accordance with various embodiments, the landmark 108 is installed permanently in the guideway, and is constructed of resilient material (e.g., steel, polymers), reducing maintenance costs and providing increased reliability.

The presence of the buried landmarks 108 is detected using reflective data generated by a ground-penetrating radar 106. The ground penetrating radar 106 transmits a radio pulse into the ground. The radio pulse penetrates the ground and reflects off materials of differing physical densities and/or permittivities, especially retroreflectors 109. The reflected radio pulse is detected by the ground penetrating radar's receiving antennas. The radar 106 has a field-of-view 115 that includes the locations of expected landmarks 108.

The retroreflectors 109 of the landmark 108 each reflect a return signal to the ground penetrating radar 106. The arrangement of the return signals in space and time represents the bits that form the encoded message. A single landmark 108 encodes multiple bits of information. In accordance with another embodiment, a single landmark 108 encodes a single bit of information.

A landmark 108 is a collection of bits encoded by retroreflectors 109. Each retroreflector 109 can represent a single bit using a single-bit retroreflector or multiple-bits using a multiple-bit retroreflector. In some embodiments, the retroreflector encodes a non-binary single bit of data, e.g., 0, 1, 2, or 0, 1, 2, 3, or the like, based on multiple levels of reflectivity.

Using a series or collection of landmarks 108, placed along various paths of the vehicle 102, the messages encoded by the landmarks 108 are processed by the on-board computer 116 to determine the location of the vehicle 102, the direction of travel of the vehicle 102, the speed of the vehicle 102 and other related information. Location is processed from the encoded ID in the landmark matched to the database. Speed is processed from known (fixed) separation between landmark reflectors. Motion direction is processed from the sequence in which the landmark is read. When the system encounters a start bit and then a stop bit, the vehicle 102 is determined to be moving in a particular direction. If the other way around, the vehicle 102 is determined to be moving in the opposite direction.

In accordance with some embodiments, the message encoded by the retroreflectors 109 of each landmark 108 is unique by design, so that when a vehicle 102 passes a landmark 108, the landmark 108 is uniquely identified. In accordance with an embodiment, the message is encoded with cyclic redundancy check (CRC) so that the accuracy of the message, such as the identification of a landmark 108, is verifiable.

Vehicle localization is provided in any situation where necessary landmarks 108 are installed in the vehicle 102 pathway. When the vehicle 102 passes over the landmark 108, the ground penetrating radar 106 receives the return signal which is sent to the on-board computer 116. The on-board computer 116 reads unique ID information, from the landmark 108 which, when cross-referenced with the known and stored position information, provides train localization information. The unique ID information is encoded in the retroreflectors, specifically in the arrangement of the individual retroreflective elements.

Buried retroreflectors 109 are placed in a pattern along the track 104 in the expected travel direction of a vehicle 102 as a reflector array. Retroreflectors 109 are constructed of steel corner reflectors encapsulated in polymer, in accordance with an embodiment. Retroreflectors 109 are buried to a depth determined by the power of the ground penetrating radar 106, e.g., between 0 and 8 feet. The propagation characteristics of the ground penetrating radar 106 determine the lateral and longitudinal resolution. The resolution values determine the minimum spacing of retroreflectors 109 both laterally and longitudinally.

The retroreflectors 109 of landmark 108 are positioned in a predetermined sequence. Travel by the vehicle 102 along the track 104 allows the encoded message to be read. Depending on the width of the field-of-view 115, retroreflectors 109 are grouped to represent one or more bits at each location along the path. Travelling over multiple retroreflectors 109 provides a complete message.

Start bit pattern 112 and stop bit pattern 114 are used to signify the MSB or LSB of the message. In accordance with an embodiment, other bit patterns could be used. When a vehicle 102 passes a landmark 108, the order in which the start bit 112 and stop bit 114 are detected provides information regarding the direction of travel of the vehicle 102.

FIG. 2 depicts a high-integrity vehicle localization and speed determination system 200, in accordance with one or more embodiments. A vehicle 202 moves along track 204. A radar 206 is mounted on the undercarriage of vehicle 202. The radar 206 transmits electromagnetic (EM) signal pulses and receives reflected EM signal pulses from a landmark 208 composed of a plurality of buried multiple-bit targets 207 in sequence along the travel direction of the vehicle 202. The multiple-bit targets 207 include an array of retroreflectors 209 or other suitable reflective objects. The multiple-bit targets 207 are installed at different depths (vertically) from the surface of the ground. An on-board computer 216 processes the reflected signal data to decode the message encoded by the landmark 208.

Because the multiple-bit targets 207 encode information longitudinally and vertically, the message encoded by the landmark 208 can be communicated at a higher rate.

When the multiple-bit target 207 encodes information by stacking multiple retroreflectors 209 vertically, the retroreflectors 209 that are installed physically higher in the array permit some of the radiation from the ground penetrating radar 206 to pass through them, to provide sufficient radiation passing through to reflect detectably from the lower retroreflectors 209.

Landmarks 208 are composed of one or more multiple-bit targets 207. Each multiple-bit target 209 is composed of a substrate material and modules of a different composition embedded in the substrate. When the ground penetrating radar 206 detects EM pulses reflected from the multiple-bit target 207, the radar 206 generates a cross-sectional subsurface density profile of the substrate and embedded modules. This data is provided to the on-board computer 216 which decodes the encoded information represented in the density profile.

A multiple-bit target 207 of the landmark 208 encodes a series of single bits in a series of columns. The multiple-bit target 207 is a matrix with each column of the matrix occupied by a single retroreflector 209 acting as a bit. This single retroreflector 209 substantially reflects the EM signal pulses, so that only one bit in each column is possible.

Buried multiple-bit targets 207 are placed in a pattern along the travel direction of the vehicle 202. Each multiple-bit target 207 consists of a substrate material within which are embedded retroreflectors 209. Each embedded retroreflector 209 is detected by processing software according to a specific radar cross-section/returned power depth, target uncertainty or target quality. Within a column, a detected retroreflector 209 is assigned a value according to its depth. For a given radar wavelength, there are N discrete depths for each retroreflector 209, forming the multiple-bit target 207 matrix rows. Thus, each retroreflector 209 represents a number from 0 to N, where 0 represents the absence of a retroreflector 209 in that column. The multiple-bit target 207 is read column-wise, producing a message composed of digits from 0 to N, with the number of digits equal to the number of columns in the multiple-bit target 207. In this way, bits are encoded laterally as well as over depth.

The multiple-bit targets 207 are sized and buried to a depth determined by the power and resolution of the ground penetrating radar 206. The lateral and longitudinal resolution is determined using the propagation characteristics of the ground penetrating radar 206. The resolution values determine the minimum spacing of modules both laterally and longitudinally. Multiple-bit targets 207 are positioned in sequence, such that travel along the track 204 allows the encoded message to be read. Travelling over one multiple-bit target 207 contains enough bits to encode a complete message. In accordance with an embodiment, multiple multiple-bit targets 207 are used.

In this arrangement, the "bits" encoded by the retroreflectors 209 are non-binary bits because the reflected EM pulse signal has both a signal-to-noise ratio and depth attributes. Therefore, the numerical value associated with each "bit" is a function of the signal strength and the depth. For example, if there are 4 discrete depths for each column then 15 combinations are attributed to each bit (24–1).

A landmark 208 is composed of many buried multiple-bit targets 207 in sequence along the travel direction of the vehicle 202. The message in the illustrated multiple-bit target 207 (read column-wise, left to right) would be "1,6,3,0,4,6".

Figure 3:
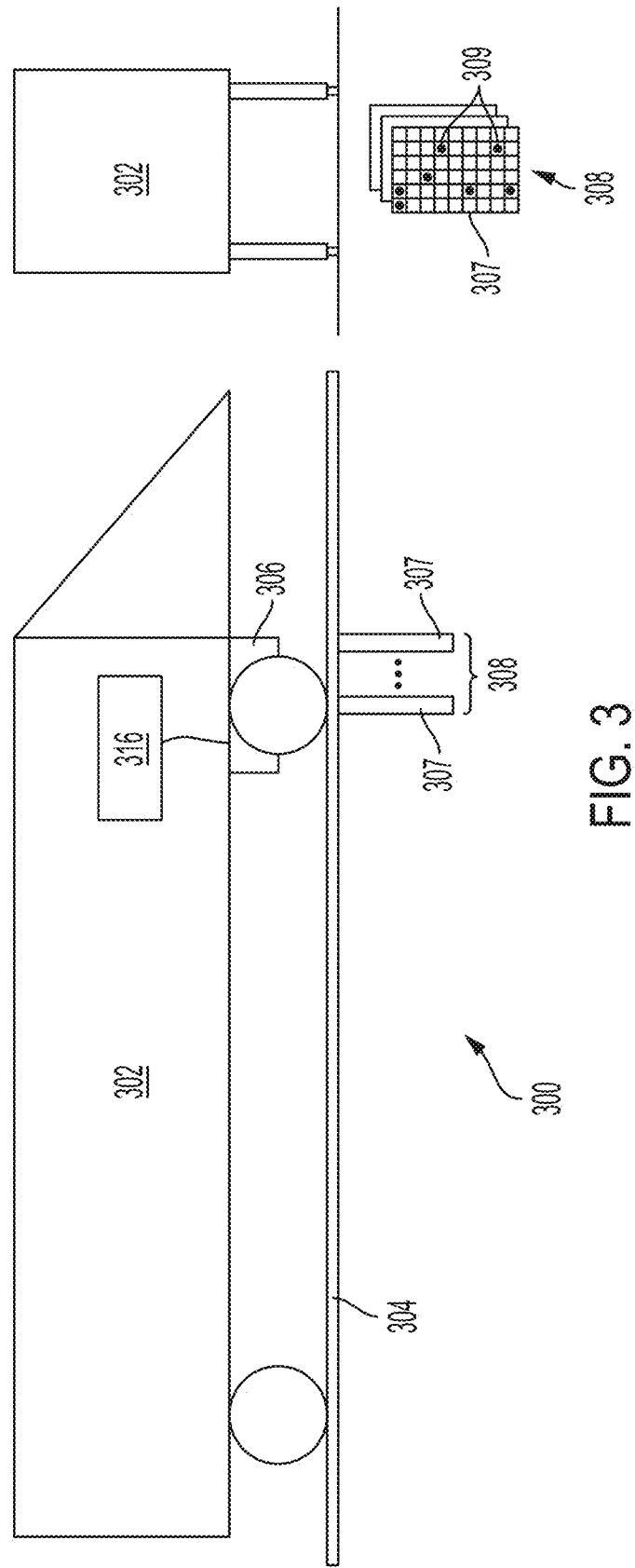
FIG. 3 depicts a landmark composed of many buried multiple-bit targets in sequence along the travel direction of the vehicle, in accordance with some embodiments.

FIG. 3 depicts a high-integrity vehicle localization and speed determination system 300, in accordance with one or more embodiments. A vehicle 302 moves along track 304. A radar 306 is mounted on the undercarriage of vehicle 302. The radar 306 detects a landmark 308 composed of many buried multiple-bit targets 307 in sequence along the travel direction of the vehicle 302.

The landmark 308 includes one or more multi-bit targets 307 encoding multiple bits in each column. The multiple-bit target 307 is a matrix of retroreflectors 309 representing multiple bits in each column (as opposed to a single bit as described above). The material forming the retroreflectors 309 allows for some reflection, to read the bit, and some transmission, to read bits that are deeper in the same column.

In this configuration, buried multiple-bit targets 307 are placed along the travel direction of a vehicle 302. The multiple-bit targets 307 consist of a substrate material within which are embedded retroreflectors 309 with electromagnetic or material properties differing from the substrate. The variation in between substrate and module material are detected by the ground penetrating radar 306. The embedded retroreflectors 309 partially reflective and partially transmissive, so that retroreflectors 309 in the same column but at a greater depth is read as well. Each embedded retroreflector 309 generates reflected signal data that is communicated to an on-board computer 316 and the position of the retroreflector is determined by processing software according to specific radar cross-section/returned power, depth, target uncertainty or target quality.

Within a column, a fixed number of discrete depths is possible for each retroreflector 309, with each discrete depth forming a matrix row. The number of discrete depths is determined by the power and resolution of the ground penetrating radar 306. Each column therefore represents a bit string with a plurality of bits. The multiple-bit target 307 is read column-wise and produces a message size determined by the number of columns and rows. In this way, bits are encoded laterally as well as over depth.

Multiple-bit targets 309 are positioned in sequence, such that travel along the track 304 allows the encoded message to be read. A single multiple-bit target 307 contains enough bits to encode a complete message. Multiple multiple-bit targets 309 are used in sequence to encode a longer message or a series of messages. In some embodiments, each bit in the multiple-bit targets 309 represents a non-binary value based on a differing level of reflectivity.

The message in the illustrated target (read column-wise, left to right) would be "100000000,100001001,001000000, 000000000,000100010,000000000".

Figure 4:
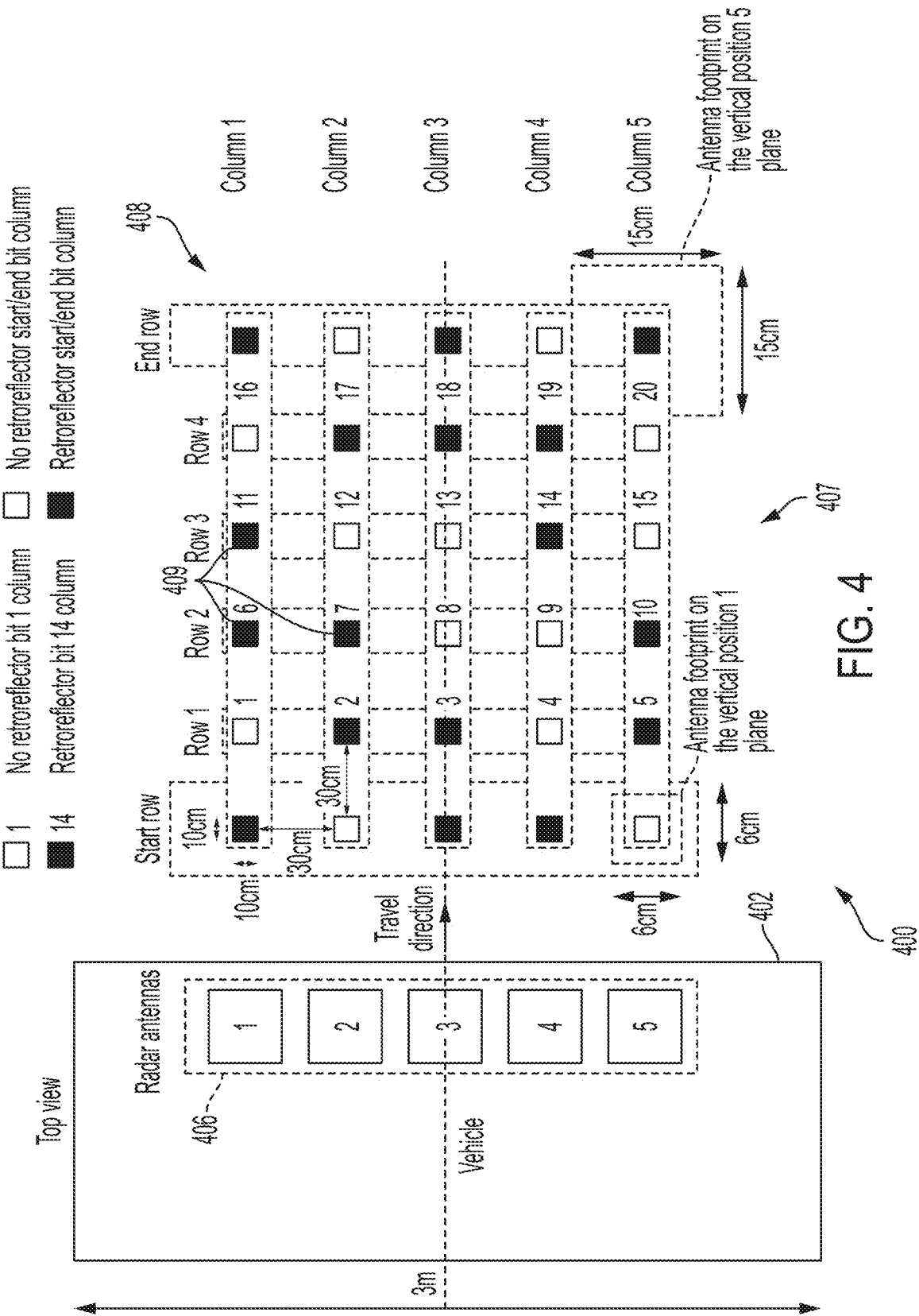
FIG. 4 depicts a landmark composed of many buried multiple-bit targets in sequence along the travel direction of the vehicle, in accordance with some embodiments.

FIG. 4 depicts a high-integrity vehicle localization and speed determination system 400, in accordance with one or more embodiments. A vehicle 402 includes a set of five radar antennas 406. The radar antennas 406 detect a landmark 408 composed of a single multiple-bit target 407 buried along the path of the vehicle 402. The multiple-bit target 407 is composed of an array of retroreflectors 409. In the depicted multiple-bit target 407, the start row of the five columns is closest to the surface while the end row of the five columns are further below the surface.

In an embodiment, a ground penetrating radar uses five down looking antennas 406, forty centimeters laterally separated (center to center) with each antenna having a ±3.5° field of view (longitudinally and laterally). The antennas 406 are installed in such a way that the first vertical position of the reflectors array in the multiple-bit target 407 is one meter underneath the antenna 406. The retroreflectors 409 are cubes with 10 cm×10 cm×10 cm dimension. The array of retroreflectors 409 is a 3-D grid in which each retroreflector element position is defined by the row index, column index and the vertical position index in the column. Each grid position is populated with a retroreflector or left "empty". If in a certain column there are more than single retroreflector 409, then the bottom retroreflectors are reflective while the retroreflectors 409 above are partially reflective and partially permissive. The retroreflectors 409 above are a hybrid of reflecting materials and pass-through materials to enable the bottom retroreflectors 409 to receive enough radiation to be reflected back and detected. The longitudinal separation between rows is 40 cm (center to center), the lateral separation between columns is 40 cm (center to center) and the vertical separation between adjacent vertical positions within each column is 40 cm (center to center). The separations are changed to accommodate radar of different power and resolution.

Figures 5A, 5B:
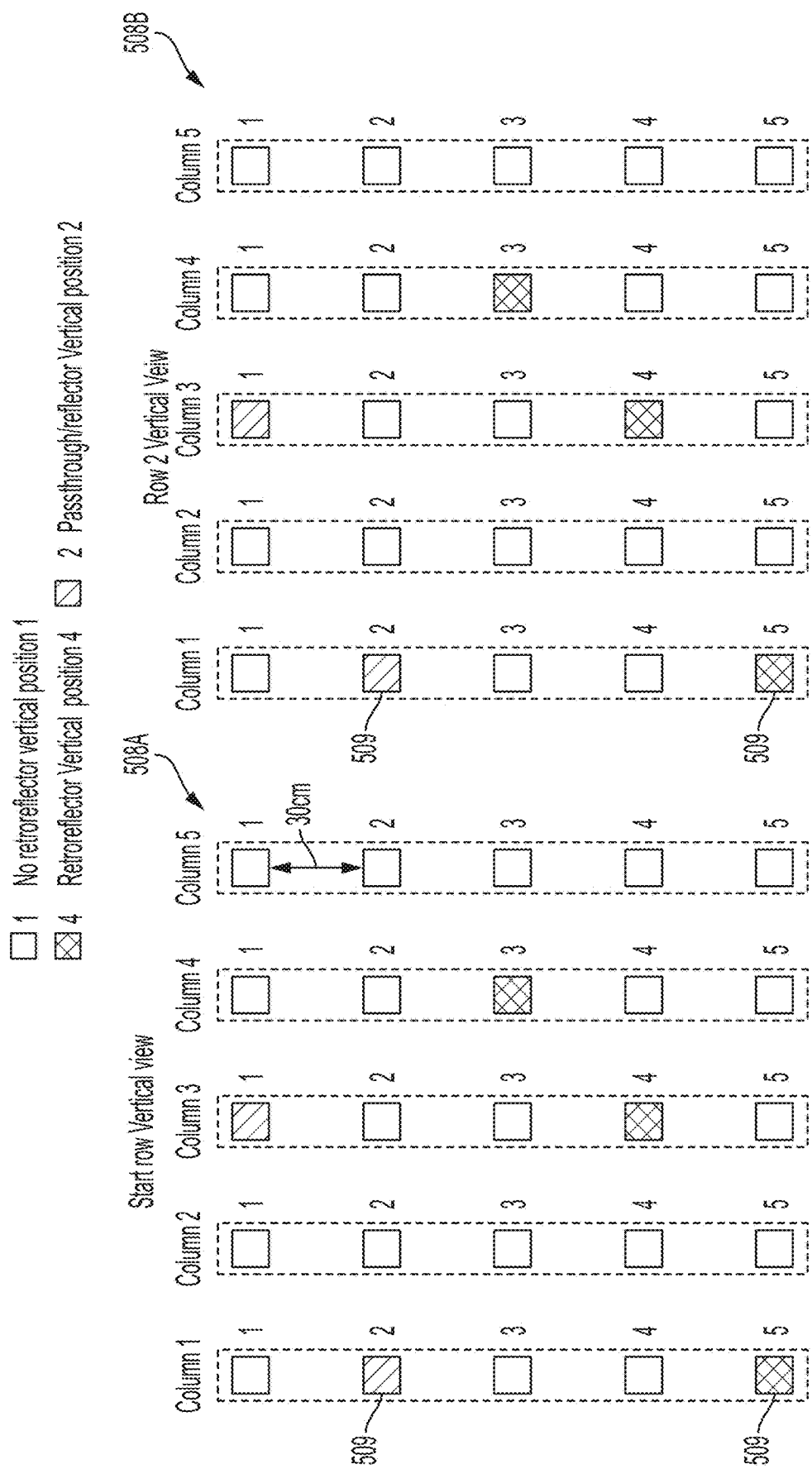
FIGS. 5A-C depict a sequence of reading a landmark composed of many buried multiple-bit targets in sequence along the travel direction of the vehicle, in accordance with some embodiments.
Figure 5C:
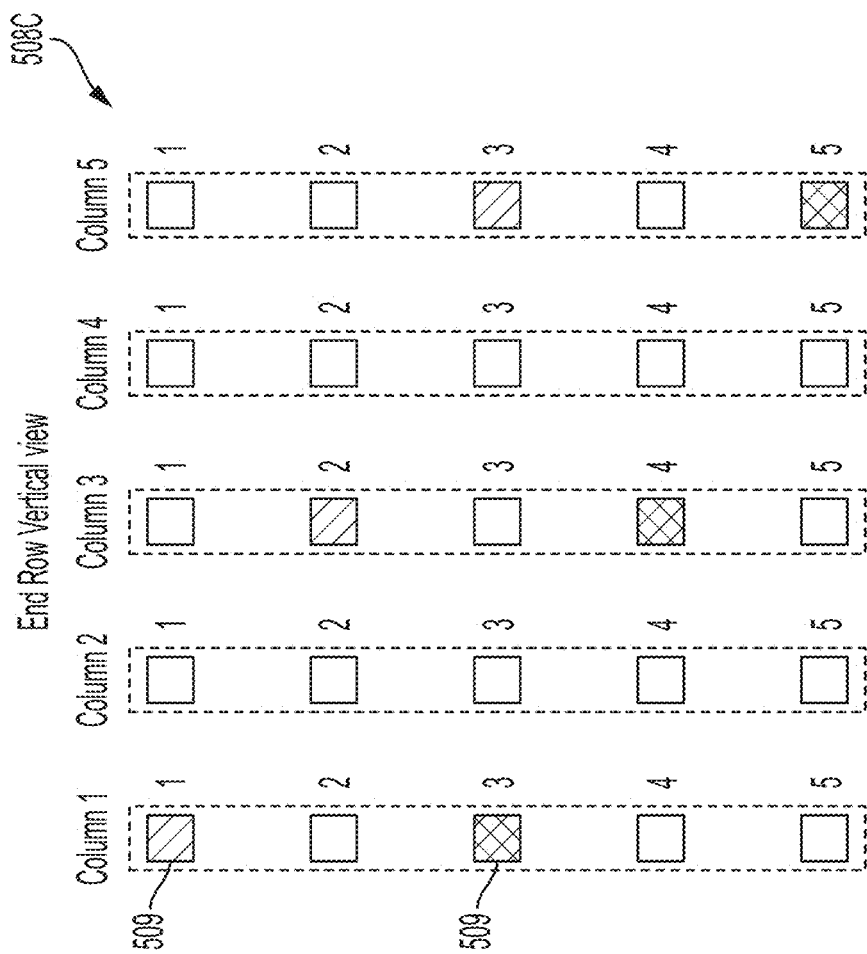

FIGS. 5A-C depict a detailed view of a sequence of multiple-bit targets 508A, 508B and 508C, composed of many buried retroreflectors in sequence along the travel direction of the vehicle, in accordance with some embodiments. Multiple-bit target 508A is an array of retroreflectors 509 forming a start row composed of five columns of buried retroreflectors 509 with five vertical positions. Where two retroreflectors 509 are present in a column, the higher retroreflector 509 is a pass-through reflector. Multiple-bit target 508B is an array of retroreflectors 509 forming a second row composed of five columns of buried retroreflectors 509 with five vertical positions. In this diagram, the depth is increasing towards the bottom of the page, and the vehicle travel direction is out of (or into) the page. Multiple-bit target 508C is an array of retroreflectors 509 forming an end row composed of five columns of buried retroreflectors 509 with five vertical positions.

Figure 6:
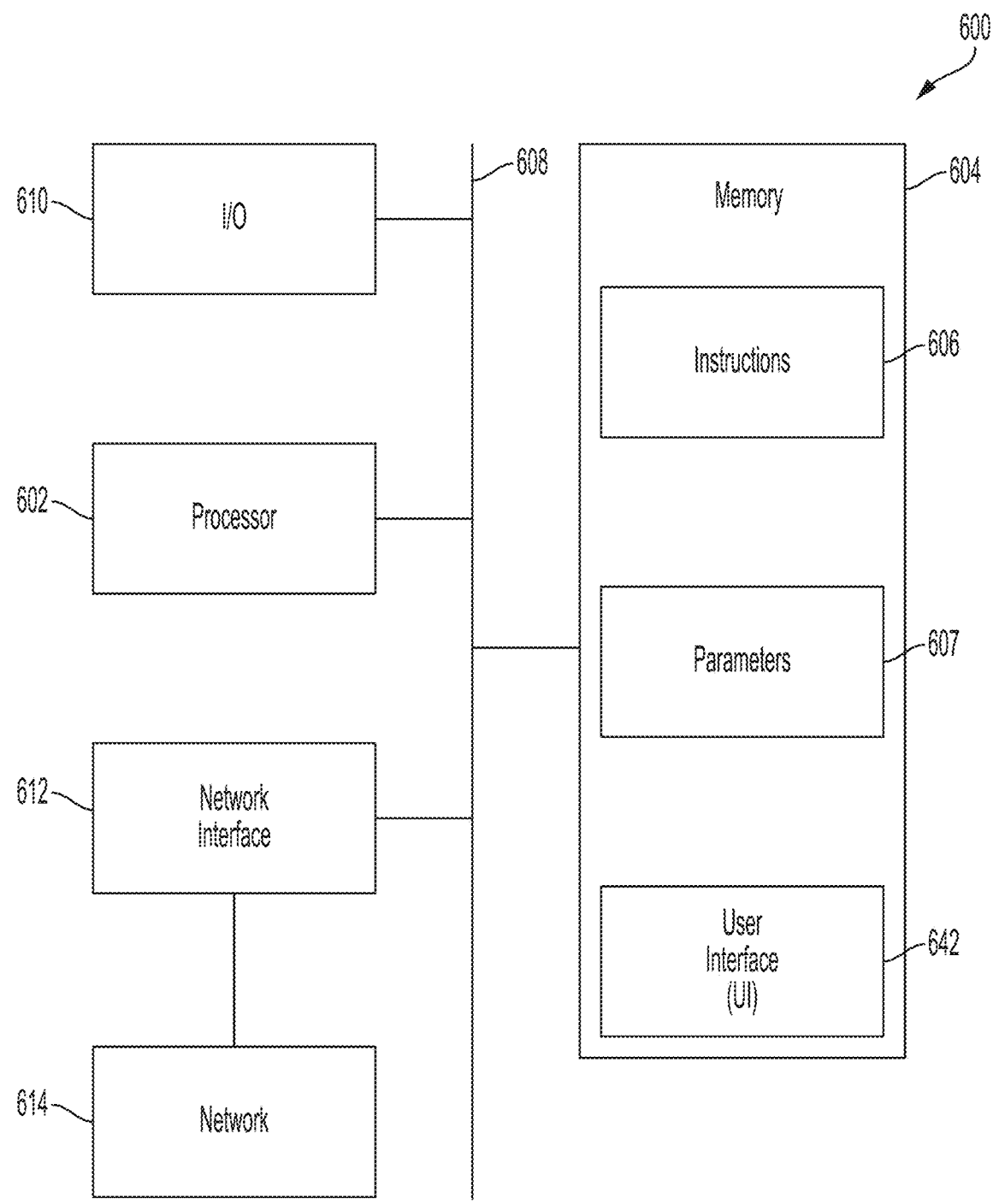
FIG. 6 is a high-level block diagram of a processor-based system usable in conjunction with one or more embodiments.

FIG. 6 is a high-level block diagram of a processor-based system usable in conjunction with one or more embodiments.

In some embodiments, vehicle localization and speed determination system 600 includes a general purpose computing device including a hardware processor 602 and a non-transitory, computer-readable storage medium 604. Storage medium 604, amongst other things, is encoded with, i.e., stores, computer program code 606, i.e., a set of executable instructions. Execution of instructions 606 by hardware processor 602 represents (at least in part) an vehicle localization and speed determination tool which implements a portion or all of the methods described herein in accordance with one or more embodiments (hereinafter, the noted processes and/or methods).

Processor 602 is electrically coupled to computer-readable storage medium 604 via a bus 608. Processor 602 is also electrically coupled to an I/O interface 610 by bus 608. A network interface 612 is also electrically connected to processor 602 via bus 608. Network interface 612 is connected to a network 614, so that processor 602 and computer-readable storage medium 604 are capable of connecting to external elements via network 614. Processor 602 is configured to execute computer program code 606 encoded in computer-readable storage medium 604 in order to cause system 600 to be usable for performing a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause system 600 to be usable for performing a portion or all of the noted processes and/or methods. In one or more embodiments, storage medium 604 also stores information which facilitates performing a portion or all of the noted processes and/or methods. In one or more embodiments, storage medium 604 stores library 607 of parameters as disclosed herein.

Vehicle localization and speed determination system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Vehicle localization and speed determination system 600 also includes network interface 612 coupled to processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 600.

System 600 is configured to receive information through I/O interface 610. The information received through I/O interface 610 includes one or more of instructions, data, and/or other parameters for processing by processor 602. The information is transferred to processor 602 via bus 608. Vehicle localization and speed determination system 600 is configured to receive information related to a UI through I/O interface 610. The information is stored in computer-readable medium 604 as user interface (UI) 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

Figure 7:
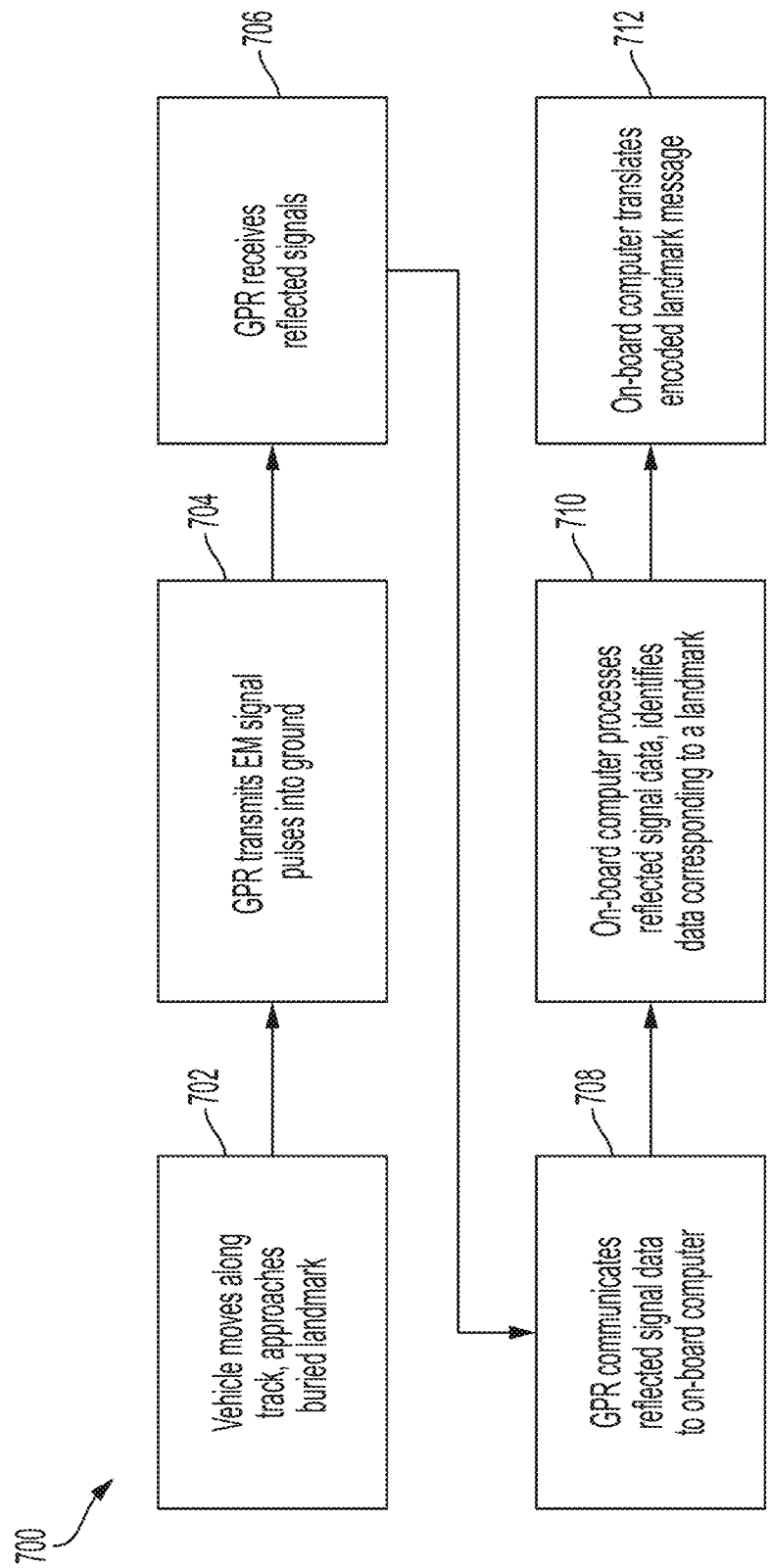
FIG. 7 is a flowchart of a vehicle localization and speed determination method, in accordance with some embodiments.

FIG. 7 is a flowchart of a vehicle localization and speed determination method 700, in accordance with an embodiment. In step 702, a vehicle, such as vehicle 102 of FIG. 1, moves along a track, such as track 104, and approaches a buried landmark, such as buried landmark 108. A ground-penetrating radar, such as ground penetrating radar 106 in FIG. 1, mounted on the undercarriage of the vehicle sends EM signal pulses into the ground at step 704. The EM signal pulses encounter the retroreflectors, such as retroreflectors 109 of FIG. 1, of a landmark and are reflected back to the ground penetrating radar in step 706. In step 708, the ground penetrating radar communicates the reflected signal data to an on-board computer, such as on-board computer 116 of FIG. 1. The flow proceeds to step 710 in which the on-board computer processes the reflected signal data and identifies data corresponding to the landmark. The on-board computer processes the reflected landmark data to decode the landmark's encoded message in step 712.

In some embodiments, the encoded information is the ID of the particular landmark (searchable in a database in order to cross-reference the landmark position). In some embodiments, the ID is cross-referenced in the database to find local grade information or other location-specific information. If the database contained landmark geometry information for each landmark, then the vehicle speed is able to be determined.

In addition to ID, in some embodiments the landmark encodes the orientation information (relative to underlying guideway), so that the vehicle passing over the landmark is able to determine the motion direction.

Figure 8:
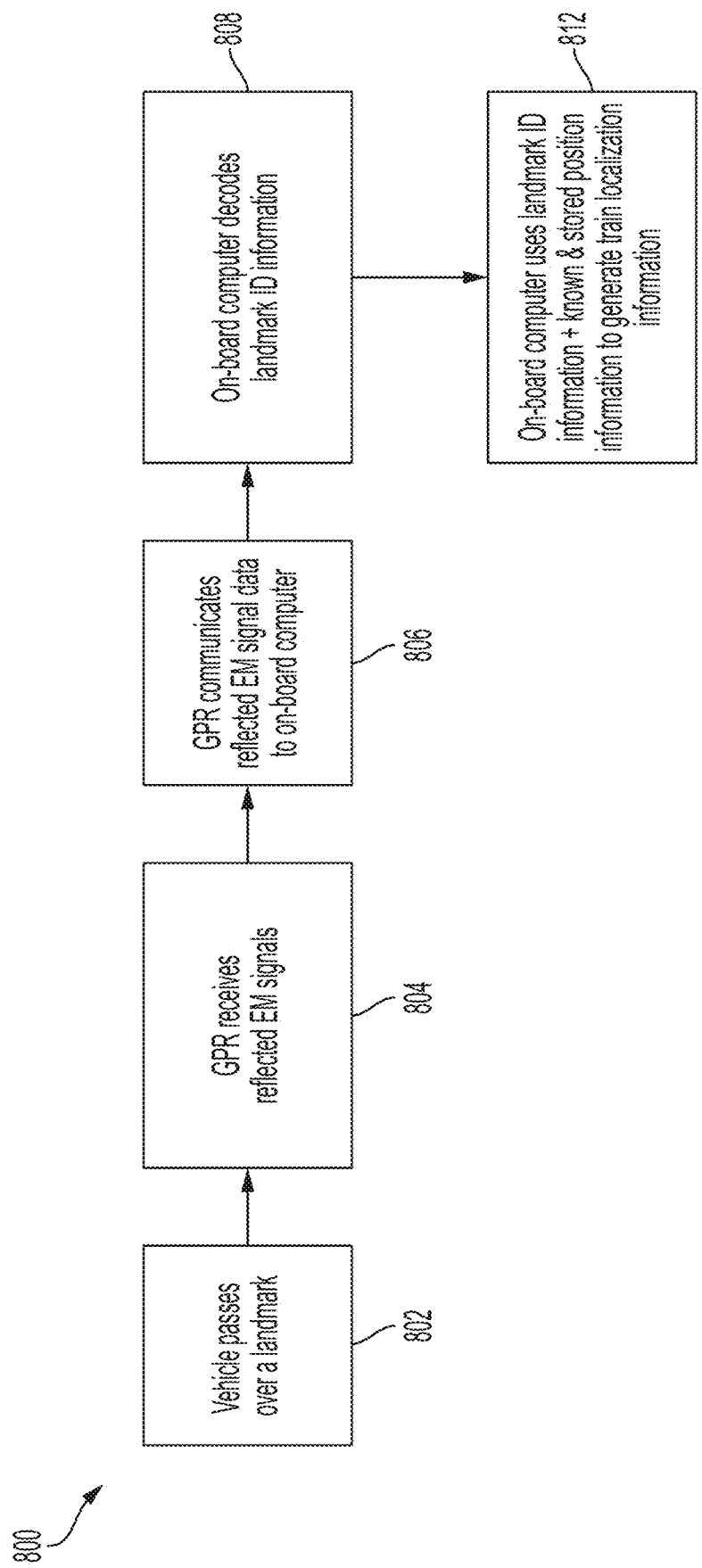
FIG. 8 is a flowchart of a vehicle localization method, in accordance with some embodiments.

FIG. 8 is a flowchart of a train localization method 800, in accordance with an embodiment. A vehicle, such as vehicle 102 of FIG. 1, passes over landmark, such as landmark 108 in FIG. 1, in step 802. The ground penetrating radar, such as ground penetrating radar 106 in FIG. 1, transmits EM signal pulses and receives reflected signal pulse data in step 804. The ground penetrating radar communicates the reflected signal pulse data to an on-board computer, such as on-board computer 116 in FIG. 1, in step 806. The on-board computer decodes the landmark's ID information in step 808. The on-board computer uses the landmark ID information in conjunction with known and stored vehicle position data and landmark position data to generate vehicle localization information in step 810.

Figure 9:
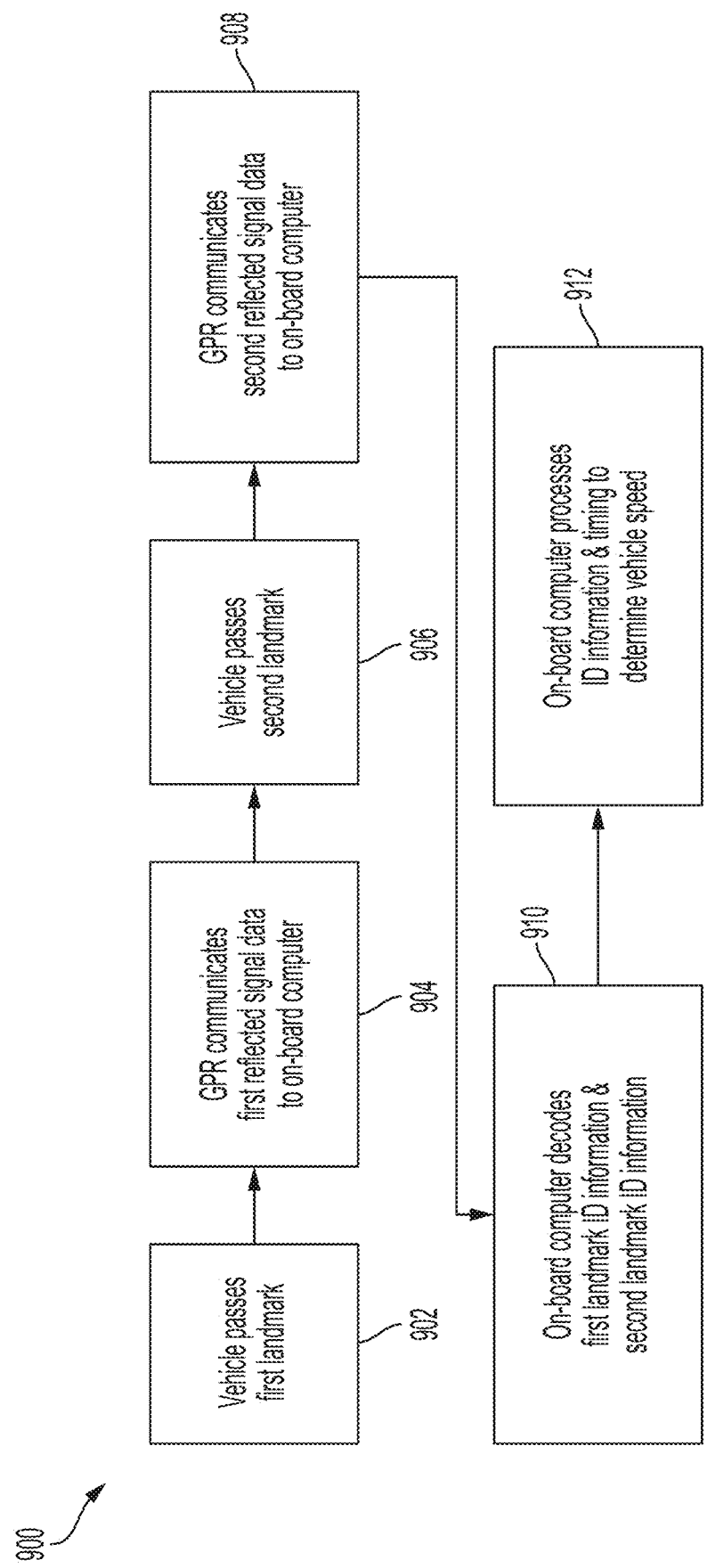
FIG. 9 is a flowchart of a vehicle speed determination method, in accordance with an embodiment.

FIG. 9 is a flowchart of a vehicle speed determination method 900, in accordance with an embodiment. A vehicle, such as vehicle 102 of FIG. 1, passes over landmark, such as landmark 108 in FIG. 1, passes over a first landmark, such as landmark 108 in FIG. 1, in step 902. The vehicle's ground penetrating radar, such as ground penetrating radar 106 in FIG. 1, detects the first landmark and communicates the first landmark data to an on-board computer, such as on-board computer 116 in FIG. 1, in step 904. The vehicle passes over a second landmark, such as landmark 108 in FIG. 1, in step 906. The ground penetrating radar detects the second landmark and communicates the second landmark data to the on-board computer in step 908. The on-board computer decodes the first landmark ID information and the second landmark ID information in step 910. Using the ID information, the landmark locations, time of travel and other information, the vehicle speed is determined by the on-board computer in step 912.

A system is described for determining the location of a vehicle including an on-board computer and a ground penetrating radar mounted on the vehicle that is communicably connected to the on-board computer. A reflective landmark is located at a known location along the path of the vehicle. The reflective landmark includes reflective elements arranged to encode data. The ground penetrating radar transmits signal energy and detects reflected signal energy reflected by the reflective landmark and communicates encoded data representative of the reflected signal energy to the on-board computer. The on-board computer decodes the encoded data and thereby determines the location of the vehicle.

The system includes a sequence of reflective landmarks, located at known locations along the path of the vehicle. The system is suitable for use on a rail vehicle. The ground penetrating radar is mounted on an underside of the vehicle.

In accordance with an embodiment, each reflective landmark encodes a single bit of data. In accordance with another embodiment, each reflective landmark encodes multiple bits of data. In accordance with an embodiment, at least one of the reflective elements is semi-transparent to the signal energy of the ground penetrating radar.

The reflective landmark includes an array of reflective elements. In accordance with an embodiment, the array of reflective elements is a two-dimensional array. In accordance with an embodiment, the array of reflective elements is a three-dimensional array.

A method is described for determining the location of a vehicle. Reflective landmarks including an array of reflective elements in known locations are placed along a vehicle's path. Signal energy is transmitted into the ground along vehicle's path with a ground penetrating radar. The ground penetrating radar detects reflected signal energy reflected by the reflective elements of the reflective landmarks. Encoded data representative of the reflected signal energy is communicated to an on-board computer. The on-board computer decodes the encoded data and processes the decoded data to determine the vehicle's location.

In accordance with an embodiment, a sequence of reflective landmarks are placed at known locations along the path of the vehicle.

A sequence of encoded data representative of the reflected energy from the sequence of reflective landmarks is processed to determine the vehicle's location.

In accordance with an embodiment, the reflective landmarks include an array of layered reflective elements, where the reflective elements of the upper layers are made from a material that is semi-transparent to the signal energy of the ground penetrating radar.

In accordance with an embodiment, encoding data from the signal energy reflected from the layered reflective elements is processed to determine the vehicle's location.

In accordance with an embodiment, the ground penetrating radar detects signal energy reflected by layers of reflective elements.

In accordance with an embodiment, the decoded data is processed to determine vehicle speed.

In accordance with an embodiment, the reflective landmark includes a linear array of reflective elements.

In accordance with an embodiment, the array of reflective elements is a two-dimensional array.

In accordance with an embodiment, the array of reflective elements is a three-dimensional array.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for determining the location of a vehicle comprises:
    an on-board computer;
    a ground penetrating radar mounted on the vehicle and communicably connected to the on-board computer; and
    a reflective landmark located at a known location along the path of the vehicle wherein the reflective landmark includes reflective elements arranged to encode data;
    wherein at least one of the reflective elements is semi-transparent to the signal energy of the ground penetrating radar;
    wherein the ground penetrating radar transmits signal energy and detects reflected signal energy reflected by the reflective landmark and communicates encoded data representative of the reflected signal energy to the on-board computer; and wherein the on-board computer decodes the encoded data and thereby determines the location of the vehicle.

2. The system of claim 1, wherein a sequence of reflective landmarks are located at known locations along the path of the vehicle.

3. The system of claim 1, wherein the vehicle is a rail vehicle.

4. The system of claim 1, wherein the ground penetrating radar is mounted on an underside of the vehicle.

5. The system of claim 1, wherein the reflective landmark encodes a single bit of data.

6. The system of claim 1, wherein the reflective landmark encodes multiple bits of data.

7. The system of claim 6, wherein the reflective landmark is comprised of an array of reflective elements.

8. The system of claim 7 wherein the array of reflective elements is a two-dimensional array.

9. The system of claim 7 wherein the array of reflective elements is a three-dimensional array.

10. A method for determining the location of a vehicle, comprising:

placing reflective landmarks including an array of reflective elements in known locations along a vehicle's path, where the reflective elements are layered vertically and where the reflective elements of upper layers are made from a material that is semi-transparent to signal energy of a ground penetrating radar;

transmitting signal energy into ground along vehicle's path with a ground penetrating radar;

detecting reflected signal energy reflected by the reflective elements of the reflective landmarks using a ground penetrating radar;

communicating encoded data representative of the reflected signal energy to an on-board computer;

decoding the encoded data; and processing the decoded data to determine the vehicle's location.

11. The method of claim 10, further comprising placing a sequence of reflective landmarks at known locations along the path of the vehicle.

12. The method of claim 11, further comprising processing a sequence of encoded data representative of the reflected energy from the sequence of reflective landmarks to determine the vehicle's location.

13. The method of claim 10, further comprising processing encoding data from the signal energy reflected from the vertically layered reflective elements to determine the vehicle's location.

14. The method of claim 10, wherein the ground penetrating radar detects signal energy reflected by layers of reflective elements.

15. The method of claim 10, further processing the decoded data to determine vehicle speed.

16. The method of claim 10, wherein the reflective landmark is comprised of a linear array of reflective elements.

17. The method of claim 10 wherein the array of reflective elements is a two-dimensional array.

18. The method of claim 10 wherein the array of reflective elements is a three-dimensional array.

19. The system of claim 1 where the reflective elements encode information in vertical columns of reflective elements.

20. The method of claim 10 wherein the reflective elements encode information in vertical columns of reflective elements.

* * * * *